Patented June 6, 1933

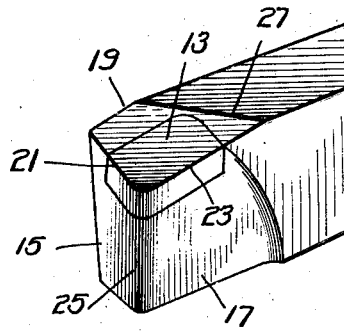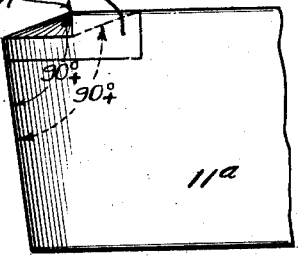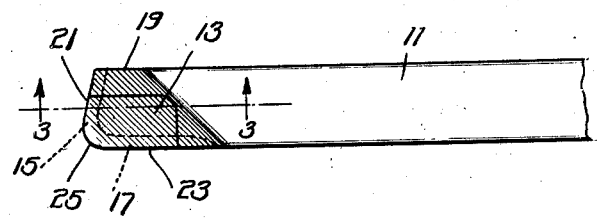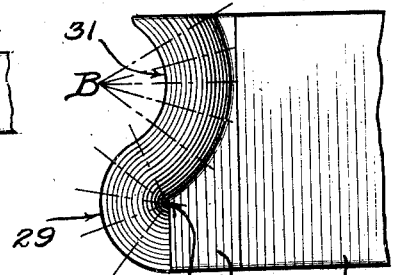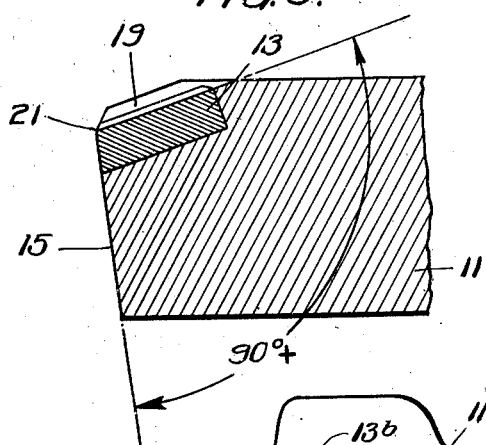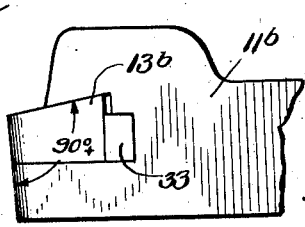

1,912,666

UNITED STATES PATENT OFFICE

ANDREW W. SWANSON, OF CHICAGO, ILLINOIS, ASSIGNOR TO WEDGE LOCK TOOL COMPANY, OF CHICAGO, ILLINOIS, A CORPORATION OF ILLINOIS

CUTTING TOOL

Application filed August 14, 1930. Serial No. 475,364.

My present invention relates to cutting tools and methods and has more particular reference to a method of dressing cutting tools, more especially tools made of especially hard materials, such for instance as the carbides of various metals, which have recently been developed for cutting purposes.

These hard materials are made by sintering, that is to say, by subjecting to tremendous heat in vacuo, blocks formed by moulding and compacting under high pressure an intimate mixture of predetermined quantities of a finely powdered carbide or carbides and cementing material. The carbides most commonly employed are those of silicon, tungsten, molybdenum and tantalum, although other cemented carbides and other hard materials are of course contemplated as being within the scope of my present invention. The cementing material, so-called, is usually a metal of the iron group such as iron, nickel, cobalt or the like.

The carbide and the cementing material are first mixed together in the desired proportions by weight. The proportions employed usually vary between 3 to 5 per cent by weight of the cementing medium, the balance being made up by the carbide content. The preliminary mixture is then ground in a suitable pulverizer such as a ball mill and the resulting powder, which is extremely fine and uniformly mixed, is then formed into bricks and sintered, i. e. heated vigorously in vacuo until the ingredients become alloyed together to form the hard cutting material, which has a homogeneous, substantially non-porous structure.

My present invention contemplates the use of this refractory metallic carbide and other similar materials for cutting as opposed to mere scraping or burnishing operations; in fact any specially hard cutting material may be used in the manner described herein to cut sizeable chips in practicing my invention.

In all cutting tools and particularly in tools fashioned from these super-hard materials there is a tendency for the cutting edge to crumble in service. If also, the tool is not carefully set to avoid chattering, the cutting edge may quickly be broken off and destroyed. It has also been found that the cutting edge of the tool may be ruined, if the machine in which the cutting operation is being performed is stopped with the tool in the cut with the feed on.

The difficulties encountered do not necessarily flow from the strength or weakness of the material used but result mainly from the manner of dressing the tool for use. A cutting edge of relatively tough material will crumble if subjected to excessive chip pressures, and it is an important object of my present invention to provide a new manner of dressing tools so that the cutting edge will sustain greater chip pressures without crumbling.

The hard materials of this general type also are extremely difficult to dress to cutting shape. For instance it is almost impossible to cut the material to size without fracturing the piece. If it is desired to move a piece of the material from a billet, in order to use it in the cutting tip of the tool, it is necessary to grind into the bar carefully so that the piece will ultimately fracture off along a desired plane. The removed piece must then be carefully ground with special compounds to its ultimate shape. This is no simple matter and the expense of dressing up the material to cutting shape is considerable. It will be apparent therefor that the repair and replacement of broken tools is expensive, and not the least of the objects of my present invention is to reduce this expense by providing a tool which is much more rugged in service while maintaining the high speed cutting characteristics of the tools heretofore produced.

On account of the tendency of the cutting edge to crumble, it has been found advisable to perform cutting operations at high speeds and with small feeds in order to reduce the strain on the cutting edge of the tool imparted by the chip pressure. When the chip pressure approaches the maximum allowable, it is necessary to reduce the feed in order to prevent the cutting edge of the tool from breaking off under the chip pressure. It has also been proposed to increase the width of the cutting edge in order to offset the reduction in speed of the cutting operation.

These various expedients are not entirely satisfactory. Circumstances frequently arise in practice where it is undesirable to use a wide nosed tool, to use fine feeds or to use a small cutting angle, etc., and an important object of my present invention is to provide a tool having a cutting edge which will stand substantially higher chip pressures than heretofore without crumbling away in service, and which consequently can be used to take rougher cuts without making special provisions against chattering.

Another important object of the invention is to provide a new method of dressing tools.

Numerous other objects and advantages will be apparent from the following specification, which, taken in connection with the accompanying drawing, discloses a preferred embodiment of my invention.

Referring to the drawing:

Figure 1 is a perspective view of a cutting tool dressed in accordance with the teachings of my present invention;

Figure 2 is a top view of the device illustrated in Figure 1;

Figure 3 is an enlarged vertical cross section taken substantially along the line 3—3 in Figure 2;

Figure 4 is an enlarged end view of the device illustrated in Figure 1;

Figure 5 is a side elevational view of a cutting tool of modified construction;

Figure 6 is a plan view of the tool shown in Figure 5; and

Figure 7 is a side elevational view disclosing means for securing a tool bit within a tapered slot.

To illustrate my invention I have shown on the drawing a cutting tool comprising a shank formed as a substantially rectangular bar or billet 11 of tool steel, or other similar material suitable for forming a support or holder for receiving a piece of especially hard cutting material of the character heretofore mentioned, it being understood that the extremely hard material is usually so brittle that the entire tool cannot be made from a single piece of the hard material but must be built up as a composite element comprising a support shank formed of relatively tough material having a bit comprising a block or segment of the hard cutting material set into the cutting edge of the support member. Consequently the shank 11 in one corner is provided with a seat adapted to snugly receive a billet 13 of the relatively hard cutting material and the tool of my invention is preferably formed as a bar of steel 11 having a billet of tantalum carbide 13 set into an edge thereof to form a cutting bit.

The billet 13 is preferably brazed to the shank 11 with copper as a brazing material by heating the tip and its holder in a furnace having an atmosphere of nitrogen or hydrogen. The billet may also be fastened in place by using a brass alloy instead of copper as a brazing material and by using a blow torch to furnish the brazing heat. The strength of this joint, however, is not as great as a copper joint, the only advantage being that the joint can be filled more easily with brass than with copper. The tool is or may be dressed by cutting the forward end along a plane 15 making oblique angles greater than 90° with the rear and bottom surfaces of the shank 11. The end of the front face of the shank 11 adjacent to the cut surface 15 also is relieved along a plane 17, which also makes an oblique angle greater than 90° with the bottom surface of the shank 11. The top surface of the shank 11, in the end adjacent the surfaces 15 and 17, is dressed along a plane 19, which slopes downwardly from the plane of the top edge of the shank toward the corner in which the billet 13 is seated, the plane 19 forming a line of intersection with the top surface of the shank. This plane 19 is formed to intersect the planes 15 and 17 along lines 21 and 23 at angles substantially in excess of 90° as illustrated in Figures 3 and 4 of the drawing, and although I prefer to keep the angle of the cutting edge less than 110° my invention is not necessarily limited to this angle but contemplates even larger angles.

I prefer also to round off the sharp edge made by and between the dressed surfaces 15 and 17, in order to provide a rounded or curved plane 25 at the intersection of these surfaces. This also connects the cutting edges 21 and 23 by means of a smooth continuous curve. The surfaces 15 and 17 and the intermediate curved portion 25 all extend at oblique angles greater than 90° with the bottom surface of the shank 11.

It will be obvious that by so dressing the end of the shank that the cutting edges 21 and 23, which are formed in the billet 13, will be substantially greater than 90°. This is apparently in direct conflict with previous practice in dressing tools for cutting operations as distinguished from mere scraping, lapping, burnishing, or reaming, inasmuch as it has heretofore been deemed essential to dress tools for this service in such a way as to provide cutting edges of substantially less than 90°. I find, however, that tools embodying my present invention are much more rugged and durable in service than tools with the finer cutting edge and that, when the especially hard tungsten carbide or similar material is used, the character of the cut is in no way impaired by utilizing the relatively blunt cutting edge for the reason that the material is so hard that, as long as sufficient support is given the cutting edge to keep the same from crumbling away, the cutting edge will not wear away since the material is of such surpassing hardness. It will be noted of course that cutting edges in excess of 90° are provided with a great deal more lateral support than is furnished edges dressed in accordance with the present practice whereby the edge is formed by planes intersecting at considerably less than 90°, and this lateral support where the cutting angle is made more than 90°, is sufficient to prevent the cutting edges of these relatively brittle though hard materials from crumbling away.

I prefer also to form the socket in the shank 11 in which the billet 13 is placed in such a way that the bottom of the socket is substantially parallel to the plane 19. In this way all of the cutting stresses imparted to the billet 13 during the cutting operation will be much more uniformly transmitted through the billet to the support shank.

The tool is used in the same manner that similar tools of ordinary construction are used. For instance, in using the tool in machinery, a rotating billet, it is supported in a suitable holder and advanced against the rotating surface of the billet. The hardness of the material causes a chip to be removed from the surface of the billet, even though the cutting edge of the tool has a negative rake.

By following the teachings of my present invention, the billet 13 is used in such a manner that shearing stresses induced in the cutting tip by chip pressure are reduced to safe limits. All overhang of the cutting material is avoided since the cutting tip is supported by the steel shank in the direction in which the stresses occur in cutting. Stresses in the cutting tip are thus accommodated and rendered harmless. It will be noted also that the billet 13 is supported on three sides and in no event is there overhang of the cutting tip, it being remembered that in using tools of this general description the cutting edge of the tool is preferably set above the center line of the work piece a distance approximately equal to 1% of the diameter of the work piece.

In Figures 5 and 6, I have disclosed a modified tool construction including a shank 11a, which supports a billet 13a, which may be secured in position upon the shank 11a in the manner hereinbefore set forth in connection with the description of billet 13, shown in Figures 1 to 4 inclusive.

Billet 13a comprises a convex cutting edge 29 and a concave cutting edge 31, which forms a continuation of the edge 29. It will be noted that the upper surface of the portion of the billet 13a, which includes the convex cutting edge 29, is cone shaped. In other words, said surface is inclined downwardly from a common point designated by the letter A. Thus, if a vertical plane is passed through the point A, as for example along one of the dot and dash lines, Figure 6, the angle included between the upper conical surface of the billet 13a and the front surface of the shank 11a will be greater than 90°.

In fact, all of the angles of intersection formed by vertical planes passing through the point A will be equal. In this manner I am able to provide the same obtuse angle at all points along the cutting edge 29. Likewise, along the concave cutting edge 31 I am able to produce substantially the same obtuse angles. In other words, any vertical plane passing through the point B designated in Figure 6, as for example along the dot and dash lines, will present the same angular cross section.

From the foregoing, it will be apparent that my invention contemplates the provision of a cutting tool in which the same obtuse angularity is present along all points of the cutting edge. This is particularly advantageous in connection with negative rake cutting tools having a round or semi-circular nose, as shown in Figures 5 and 6.

In Figure 7 I have disclosed a still further modified construction which includes a tool shank 11b provided with a tapered slot for receiving a billet 13b. It will be noted that the billet is tapered in accordance with the taper of the slot within the tool shank and is secured in position by means of a suitable wedge 33. Therefore it will be understood that my invention is not limited to any particular means for securing the tool bit or billet in position upon a holder, but contemplates the use of various mechanical devices such as the wedging device shown in Figure 7 as well as the method of brazing described in connection with the other figures.

Attention is directed to the fact that materials such as tantalum carbide have a low conductivity of heat. This makes it particularly suitable for tools subjected to a great deal of friction because the heat generated by such friction is thus carried off by the chips rather than absorbed by the tool itself. This prevents excessive heating of the tool and consequently the brazing between the bit and the shank is not softened to the extent that it will come loose as readily as if the metal were of a higher heat conductivity. A tool having a negative rake cutting edge is naturally subject to greater friction than a tool having an acute cutting edge. The fact that tantalum carbide has a low heat conductivity makes this metal particularly suitable for tools of negative rake cutting edges. In view of the foregoing it will be understood that the low conductivity of the metal more than offsets any disadvantage of greater friction carried by the negative rake.

I have described my invention as applied in a tool for performing a cutting operation upon the outer surface of a rotating billet or work piece. It will be obvious however that the principles of my invention may be embodied in reamers or other boring tools, facers and in fact any other cutting tool wherein a negative rake is required without departing from the spirit and scope of my invention or sacrificing any of its inherent advantages.

It is thought that the invention and numerous of its advantages will be apparent from the foregoing description.

Having thus described my invention, what I claim as new and desire to secure by Letters Patent is:

1. In a cutting tool of the class described, a shank portion and a metallic carbide insert having a curved cutting edge formed in the insert, said cutting edge being formed by the intersection of the upper and end surfaces of the insert, said surfaces meeting at said cutting edge at an angle greater than 90°, said angle being substantially equal at all points along said cutting edge.

2. A cutting tool comprising a metallic carbide insert having a front wall formed as a curved surface and an upper wall comprising a substantially conical surface, said curved and conical surface intersecting to form a curved cutting edge, the angle between said conical surface and said curved surface being greater than 90° in order to provide a cutting edge having a negative rake.

In witness whereof, I have hereunto subscribed my name.

ANDREW W. SWANSON.